(12) United States Patent
Karamchetty (10) Patent No.: US 6,728,881 B1
(45) Date of Patent: Apr. 27, 2004

(54) FINGERPRINT AND SIGNATURE IDENTIFICATION AND AUTHORIZATION CARD AND PEN

(75) Inventor: Somayajulu Karamchetty, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/413,061

(22) Filed: Oct. 1, 1999

(51) Int. Cl.[7] ................................. G06F 1/26
(52) U.S. Cl. ................ 713/186; 713/182; 713/185; 713/189; 713/193; 713/200; 713/201
(58) Field of Search ................ 713/186, 182, 713/185, 189, 193, 200, 201

(56) References Cited

U.S. PATENT DOCUMENTS 5,280,527 A * 1/1994 Gullman et al. ............ 713/184
5,838,306 A * 11/1998 O'Connor et al. .......... 345/163
5,852,670 A * 12/1998 Setlak et al. ................ 382/126
5,956,415 A * 9/1999 McCalley et al. .......... 382/124
5,963,679 A * 10/1999 Setlak ........................ 382/312

* cited by examiner

Primary Examiner—Thomas R. Peeso
(74) Attorney, Agent, or Firm—Paul S. Clohan, Jr.; William W. Randolph (57) ABSTRACT

An authorization system uses card and signature devices to provide access to a machine. The devices include capacitance grids positioned on different surface regions of the devices to convert fingerprint images of at least two fingers into electrical signals. An images processor in the device processes the electrical signals detected from the fingerprints to produce electrical images of the user's fingerprints. The devices store fingerprint and encrypted user identification data. An authenticating processor compares the user's fingerprints detected on the capacitance grids with authorized user's previously recorded fingerprint's and the user's name and identification data to produce an authenticating signal if there is a match of the fingerprint images. Signature storage and identification can be provided to store and authenticate the uses's electronic signature.

24 Claims, 10 Drawing Sheets

FINGERPRINT AND SIGNATURE IDENTIFICATION AND AUTHORIZATION CARD AND PEN

RIGHTS OF THE GOVERNMENT

The invention described herein may be manufactured, used, and licensed by or for the United States Government for governmental purposes without the payment to us of any royalty thereon.

BACKGROUND OF THE INVENTION

1. Field of the Invention

This invention is in the field of computer and information systems. More specifically, it relates to hardware devices, such as smart cards and signature devices that authenticate a user of a system. These systems use biometric characteristics that are unique to an individual user. Fingerprint identification is one example of such devices. Signature verification is another such characteristic unique to a specific user.

2. Description of the Prior Art

The nineteen eighties and nineties have seen enormous developments in computers, communications, networks, Internet, and the World Wide Web (Web). The Internet and the Web, in particular have allowed people from anywhere in the world to connect instantaneously to others on the Web. Remote operation of devices and remote access to information from anywhere globally is now possible.

This ability to connect anywhere into a network of computers has given rise to problems of security. Several types of computer attacks are now possible due to this open connectivity. Hackers can connect into your network and wreak havoc on the system. Adversaries can gain access to information and use it in unintended ways against the original owners. Adversaries can even shut down systems or turn them against the owners. The miscreants and adversaries can be from within an organization's network or from outside a network. After several serious attacks on vital systems, Information Systems Security has been recognized as a real and serious issue.

Security of information, by itself, is nothing new. People, organizations, businesses, and governments have been guarding information for a long time. Cryptography, encryption, and other forms of safeguarding information has been in vogue for many centuries.

One of the facets of information security consists in identifying a user as who he/she claims he/she is. Use of a password to identify a person has long been accepted as a reasonable method of authorization of a user. However, as computer systems are increasingly applied to vital information (e.g. defense and financial systems), mere password protection of systems is unacceptable. Moreover, hackers and abusers are becoming increasingly sophisticated at discovering (spoofing) passwords. They are able to break system security and gain entry to systems.

When users and system administrators deal with multiple systems and individual passwords for each system and application, the verification and authentication process becomes highly complicated. Fearing that they might forget their passwords, people tend to write their passwords in some file and expose their information and the systems to security risks. To avoid such risks, fingerprints are seen as identification marks for all systems and applications that one is allowed access to.

Use of Biometric devices has been accepted as a more secure method of user identification. Finger prints, face prints, eye prints, and voice prints are some of the examples of an individual's characteristics now being used for identification purposes. Currently, many commercial developments are on the market.

American Biometric Company, Ottawa Canada has developed a system, called BioMouse that authenticates a rightful user and prevents other intruders into a system. New biometric sensors from Phillips Flat Display Systems, San Jose, Calif. and Who? Vision Systems Inc., Lake Forest, Calif., ensure that only authorized users can access portable computing and consumer electronic products. The thin devices can be integrated into mobile phones and personal computers.

Smart-card acceptance is expected to surge over the next year as hardware vendors, responding to increased demand for enterprise security, install smart-card readers into hardware. The cards will store x.509 certificates for user authentication, using Gemplus Corporation smart card systems. Smart-card manufacturers, such as Baltimore-based Information Resource Engineering Inc., are pushing the technology envelope. According to this report, the market for the smart-cards will jump from $941 million in 1997 to $4.7 billion in 2002. Users place the card in the reader and a finger on the silicon chip on the card. The chip will take a 300-point snap shot of the fingerprint and permanently store it in that card. From that point, the card won't activate unless it receives that image. The card also stores a private key that is used in public key exchanges with servers to add another layer of user authentication and encryption.

Biometric vendors are looking to jump-start their market with cheaper and more effective technologies geared for PCs. Verdicom will show a fingerprint recognition module that uses a Universal Serial Bus, PCMCIA or a parallel port to connect to PCs. The Santa Clara, Calif. company's FPS 100 fingerprint chip, which costs $30 in volume, will be used in notebooks from Acer America Inc., Hewlette-Packard Co., and NEC Computer Systems Division. WhoVision, of Lake Forest, Calif., will demonstrate keyboards from Mag Innovision Inc. that use its fingerprint sensor technology. SAFLink, of Tampa, Fla., will release a new desktop application called SAFty (Secure Authentication Facility) Latch. SAFty Latch will enable users to employ voice recognition technology to encrypt desktop files with the Blowfish symmetric algorithm. Visionics, of Jersey City, N.J., will demonstrate FaceIT NT, its facial recognition software. IrisScan, of Mount Laurel, N.J., will ship its new PC Iris product.

Compaq's FIT (Fingerprint Identification Technology) examines what are called fingerprint minutiae—the contours and points unique to each fingerprint. FIT stores the minutiae-point pattern in an NT database in the same place as authentication passwords.

ApproveIT 3.5 for Office 3.5, helps you capture and authenticate electronic signatures. The result is that you can have binding approval cycles with individuals' signatures and verify that documents have not been altered in unauthorized ways. These are important in specific applications such as those in legal and regulatory industries, where document approval is part of an audit trail or approval process. Organizations that are both concerned with document security and trying to "go paperless" have this tool from Silanis Technology Inc.

SUMMARY OF THE INVENTION

It is an object of the invention to provide the following benefits over conventional cards, devices and systems: two fingerprints add greater security; fingerprint images are carried by the user and are not (necessarily) stored in any computer system; fingerprint images are not output at any time; an encrypted signal is sent to the access processor; the encrypted signal is sent only upon verification of the authenticator's signature; the pen design makes it easy to carry around and sign key legal and financial electronic documents; it can also record signature numbers and what documents they were placed on; no third party sees the actual fingerprint or the actual signature, thus avoiding chances of forgery on paper documents. The result of the invention is a high degree of mutual security of the card or pen and the access processor from each other is maintained.

The invention embodied by the card has several component modules. There are two capacitance grids to simultaneously convert fingerprint images of the thumb and pointing finger into an electrical signal. There is authenticator software of a Certifying authority for authenticating the user name, User ID, and finger prints. There is an authenticator signature storage to authenticate the agency's electronic signature. Also provided is an image processor to process the fingerprint image(s) with the authenticator's signature algorithm and an access signal generator to gain access to the connected machine. The system has image storage for the encrypted electronic image of the fingerprints and data storage for encrypted user data as well as a power supply to operate card circuits.

The operation of this card system is in two phases. In the "Authentication Phase", a blank card is connected to the authenticator by inserting it into an appropriate connector interface and user data is entered into the authenticator's machine. The user holds the card so that impressions of the thumb and index finger are picked up by the capacitance grids. Next, the authenticator algorithm is loaded and the authenticator's signature is stored. Using the authenticator algorithm, the fingerprints are processed into resulting encrypted images. User data is stored in the user data storage and the encrypted fingerprint images are stored in the image storage. At the end of the "Authentication Phase", the user then has a card with his/her personal details and fingerprint images duly authenticated and encrypted.

Next comes the "Access Phase" in which the user inserts his/her pre-authenticated card into the access processor machine interface and user data is entered into the authenticator's machine. The Authenticator and access processor check that they are compatible; if they are not, further processing is discontinued and access is denied by the access processor. If they are compatible, the user data is then compared. If there is a match, the user's impressions of the thumb and pointing finger are picked up by the capacitance grids. The Authenticator's signature is loaded into the algorithm. Using the authenticator algorithm, and signature, the fingerprints are processed into images. The encrypted fingerprint images are retrieved from the image storage and compared to the processed current images. If the images match, an access signal is generated. The access signal is sent to the access processor machine and, if there is a match, access is granted.

In summary, although computer and information systems have made enormous strides, security issues may impede further progress of these systems. We are positioned at the dawn of a great information revolution in the form of Internet and Web. Highly reliable and easy to use security systems are needed to fully realize the fruits of this impending revolution. With the instant invention, people can enhance their identification security and authentication of documents.

American Biometrics Company claims a False Acceptance Rate (FAR) of 1 in 300 for their device. False acceptance is the condition when a wrong person is identified as the acceptable person. By processing two fingerprints in parallel, as suggested by the inventor, the FAR value can be decreased by several orders of magnitude. When the acceptance condition is that both fingerprint signals be passed, the combined FAR value will be a product of the individual FAR values. That means the resulting FAR will be 1 in 300 times 1 in 300, or it will be 1 in 90,000, an improvement of 2 to 3 orders of magnitude. That is a much better protection against intruders.

American Biometrics Company claims a False Rejection Rate (FRR) of 1 in 10,000 for their devices. False rejection is a condition where the right person is rejected owing to inadequacies of the signal resolution. When a combination of two fingerprints are used, the FRR improves four orders of magnitude.

When the authentication conditions include a combination of two fingerprints and a signature, the FAR and FRR improve tremendously.

DETAILED DESCRIPTION OF THE PREFERRED EMBODIMENTS

Figure 1A:
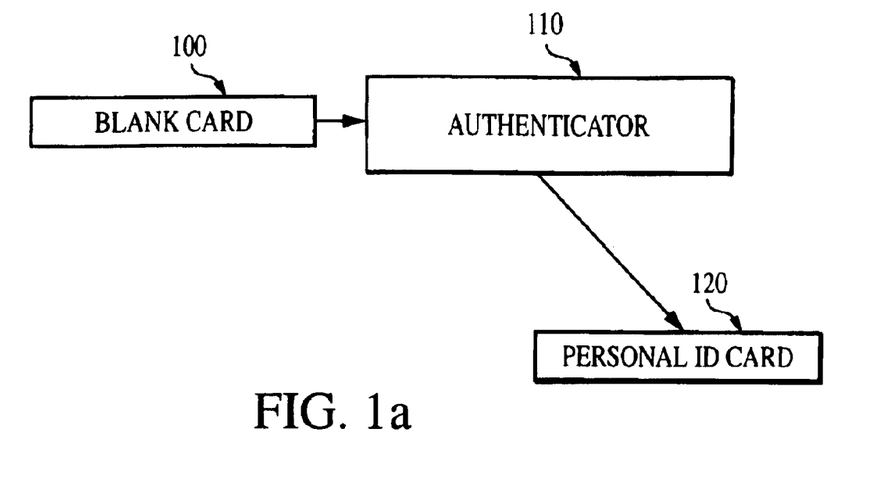
FIG. 1 shows how the proposed fingerprint ID card works.
Figure 1B:
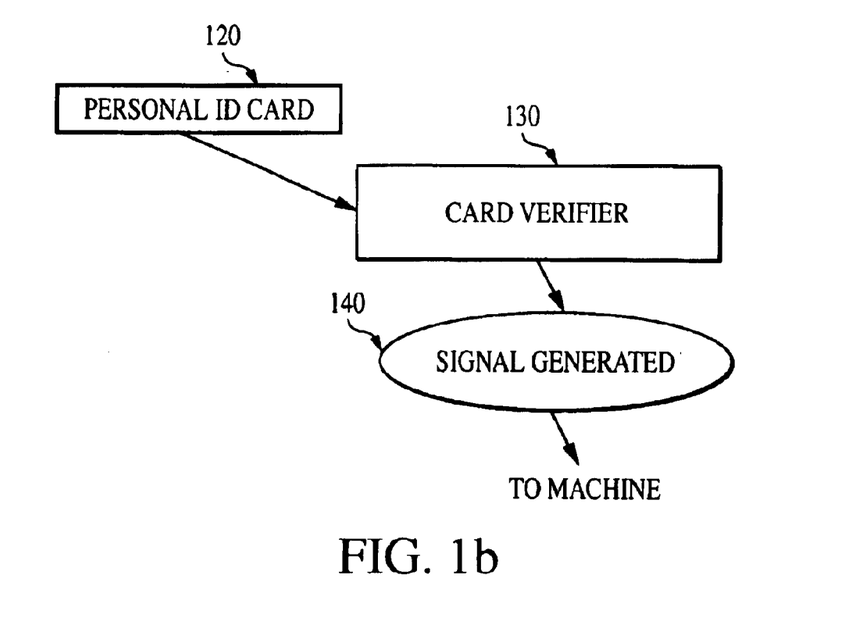

FIG. 1 shows a blank card 100 which will be interfaced with an authenticator 110, and after due processing, the card becomes an authenticator card 120 for the person presenting the card to the authenticator. Subsequently, the owner of the card may wish to use the card in combination with a computer system. The owner presents the card 120 to an access verification system 130. The system generates a signal 140 authorizing the use of the system by this user. The blank card 100 has no details on it. While the authenticator card 120 has the user identification details (like name and user account number) and the fingerprint identification of the user. The user types the identification details while the fingerprint identification is automatically generated by the authenticating machine. In order to generate the fingerprint identification information, the user holds the card between his/her thumb and index finger. Both fingers are used in the identification information.

Figure 2:
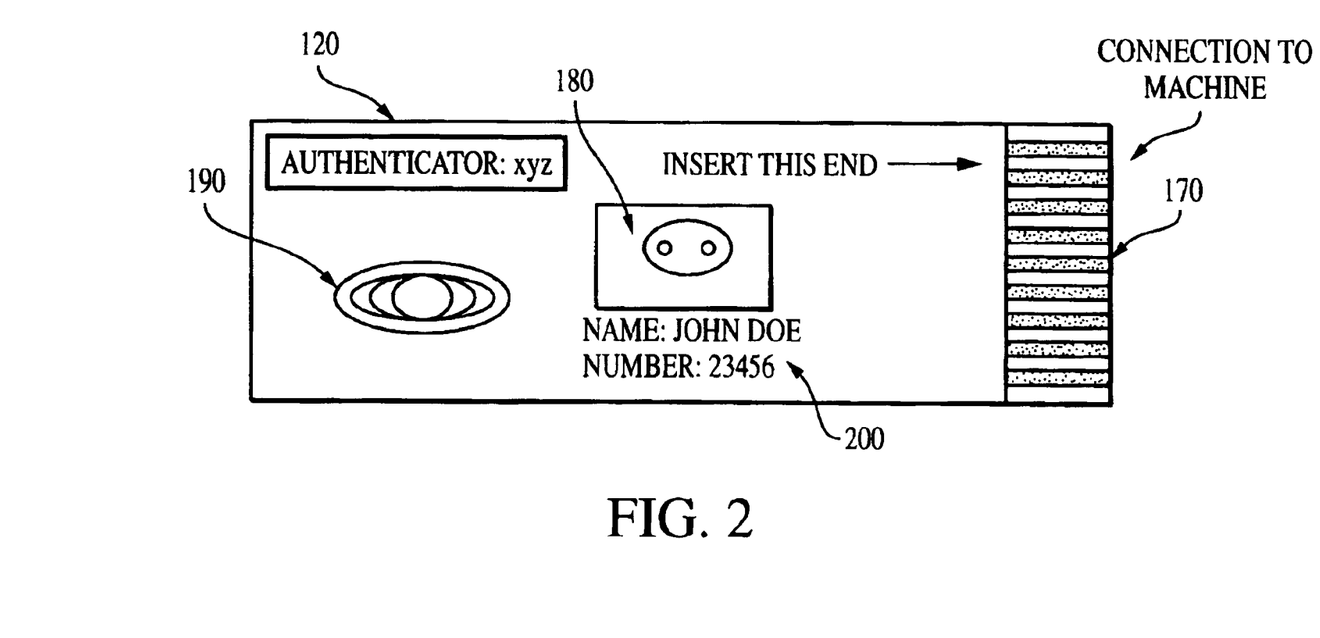
FIG. 2 shows the physical details of the card.

FIG. 2 shows plastic card 120, which looks like any credit card or smartcard. Area 170 is the interface that the card bears with a card reading device. As shown in FIG. 2, the card has electrical contact at area 170, so that the card can be pressed into a reading device which makes the proper electrical contacts. Area 180 is a place where a picture identification of a user can be placed. This will be similar to a photo id given to a motor vehicle operator now. Area 190 shows where the user is expected to hold the card. This area has sensors for fingerprint identification. These fingerprint sensors are placed on both sides of card 120. When a person holds card 120 in a very natural fashion between the thumb and the index finger, both fingerprints are taken. The double prints help increase security. With two such prints available, several alternative encryption schemes can be used subsequently. Area 200 has the cardholder's name and any other identification numbers.

Figure 3:
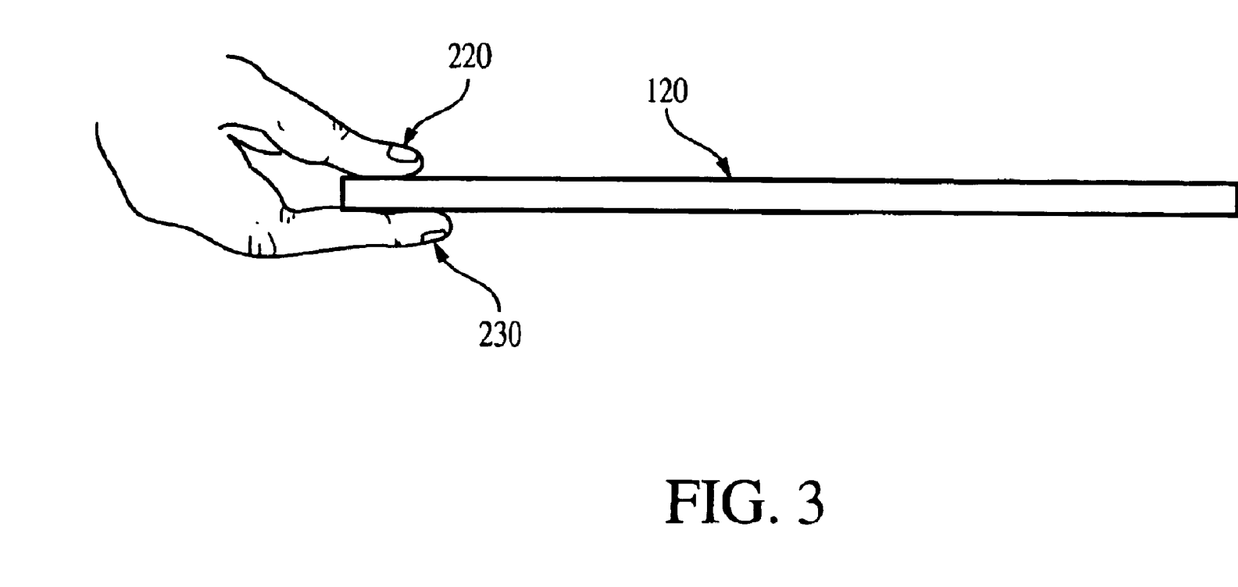
FIG. 3 shows the proposed card held between thumb and pointing finger.

FIG. 3 shows card 120 under thumb 220 and index finger 230 for the scheme to work properly.

Figure 4:
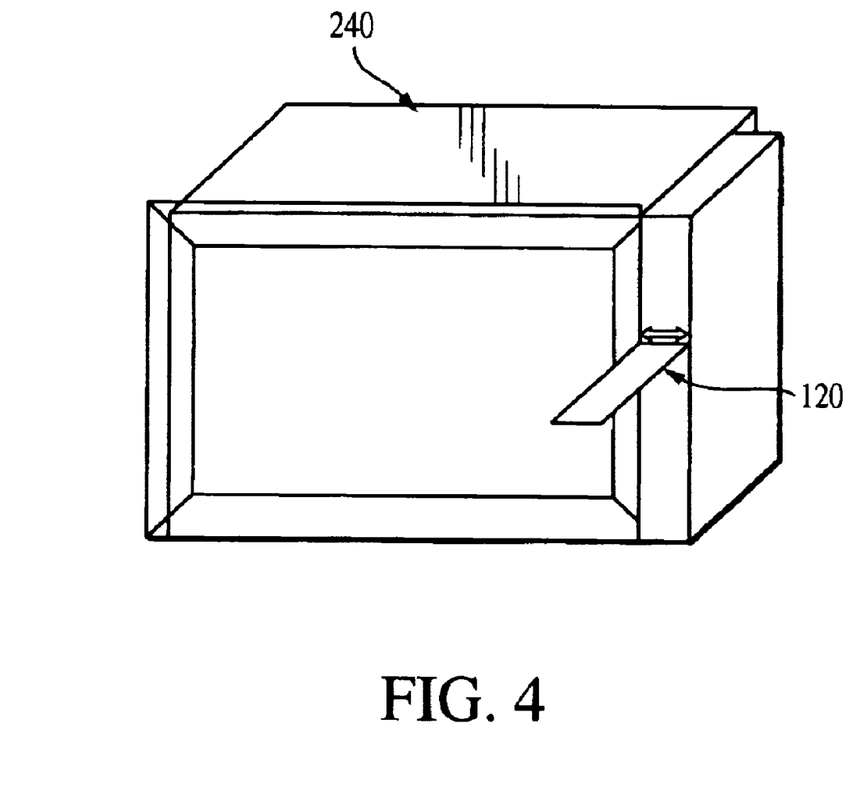
FIG. 4 shows the card inserted into a machine.

FIG. 4 shows a machine 240 such as a computer system (or an ATM machine at a bank) with the card 120 inserted into the slot provided for insertion of the identification card. With the card carrying the user's fingerprint identification, there is no need for the user to enter any password or PIN (personal identification number). If the account number and the fingerprint identification match, the user is given access to the machine.

Figure 5:
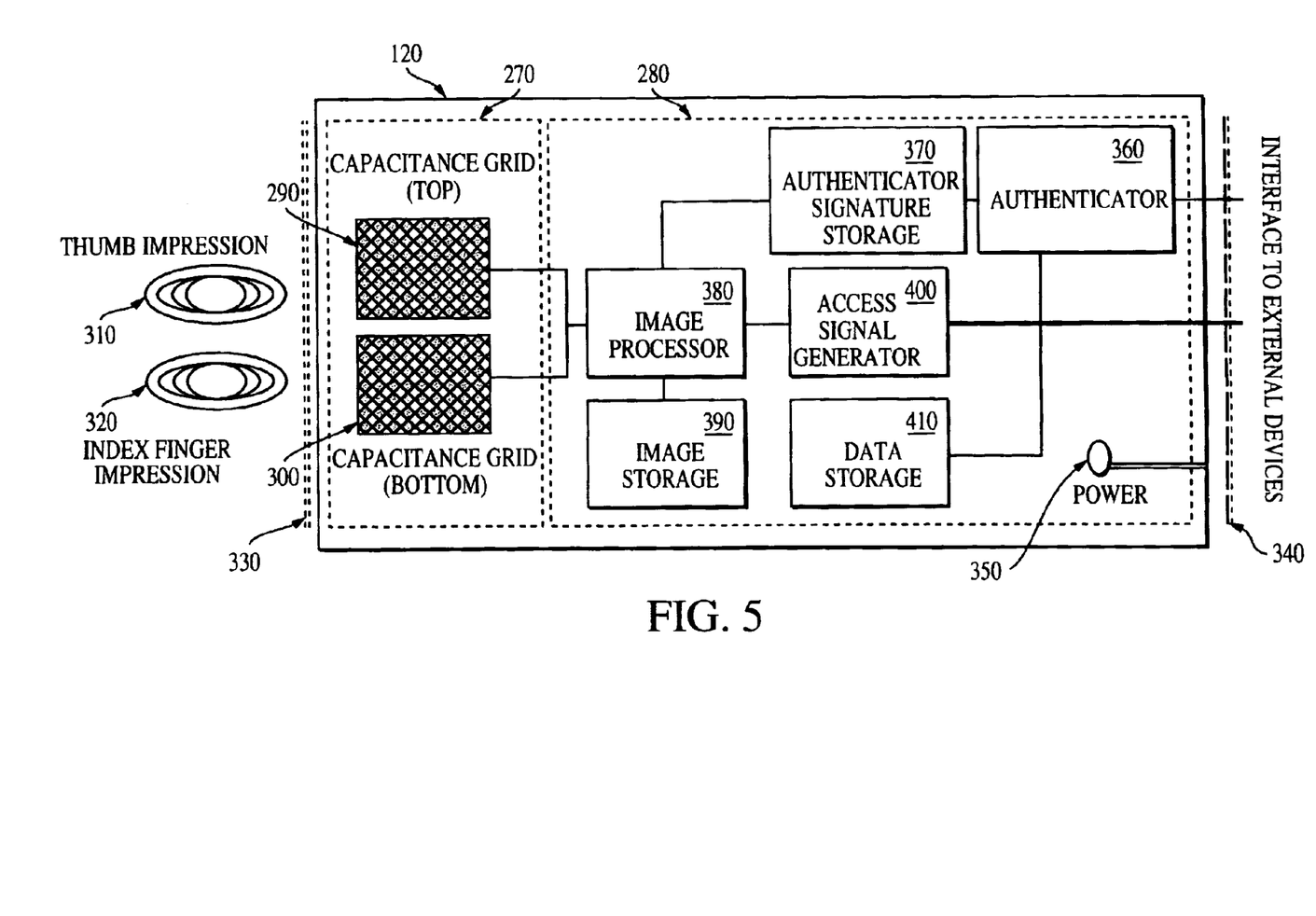
FIG. 5 shows details and interfaces.

FIG. 5 shows the card 120 with the two functional areas shown in separate blocks. Area 270 contains the capacitance processors. The two fingerprints are sensed by means of an array of capacitance sensors. Unique to the characteristics of each person's fingerprint, a certain signal is generated. The two capacitance grids 290, 300 generate two separate signals. Areas 310 and 320 contain the fingerprint impressions formed when the user presses on the sensing grids. Area 330 contains the interface with the fingers, which, can be a thin plastic to protect the sensing surfaces. There is no need to apply undue pressure. Area 280 contains the processing blocks on the card. Area 380 contains the image processor that processes the capacitance signal. When a blank card is processed with an authenticator during the card making stage, an image is created and stored in image storage 390. Area 360 contains the authenticator block on the card that processes the raw capacitance signal and generates an authentication signature 370. During the usage phase of the card, the fingerprint signal generated is compared with that stored in area 390 in the card. An access signal is generated by generator 400. This access signal is now available to interface 340 for transmission to the machine with which access is being sought. The other data about the user and the authenticator is stored in data storage 410. The power storage to operate the card is at area 350, which can be a battery, or a battery on a chip, or a battery in combination with power supply line taken from the interface.

Figure 6:
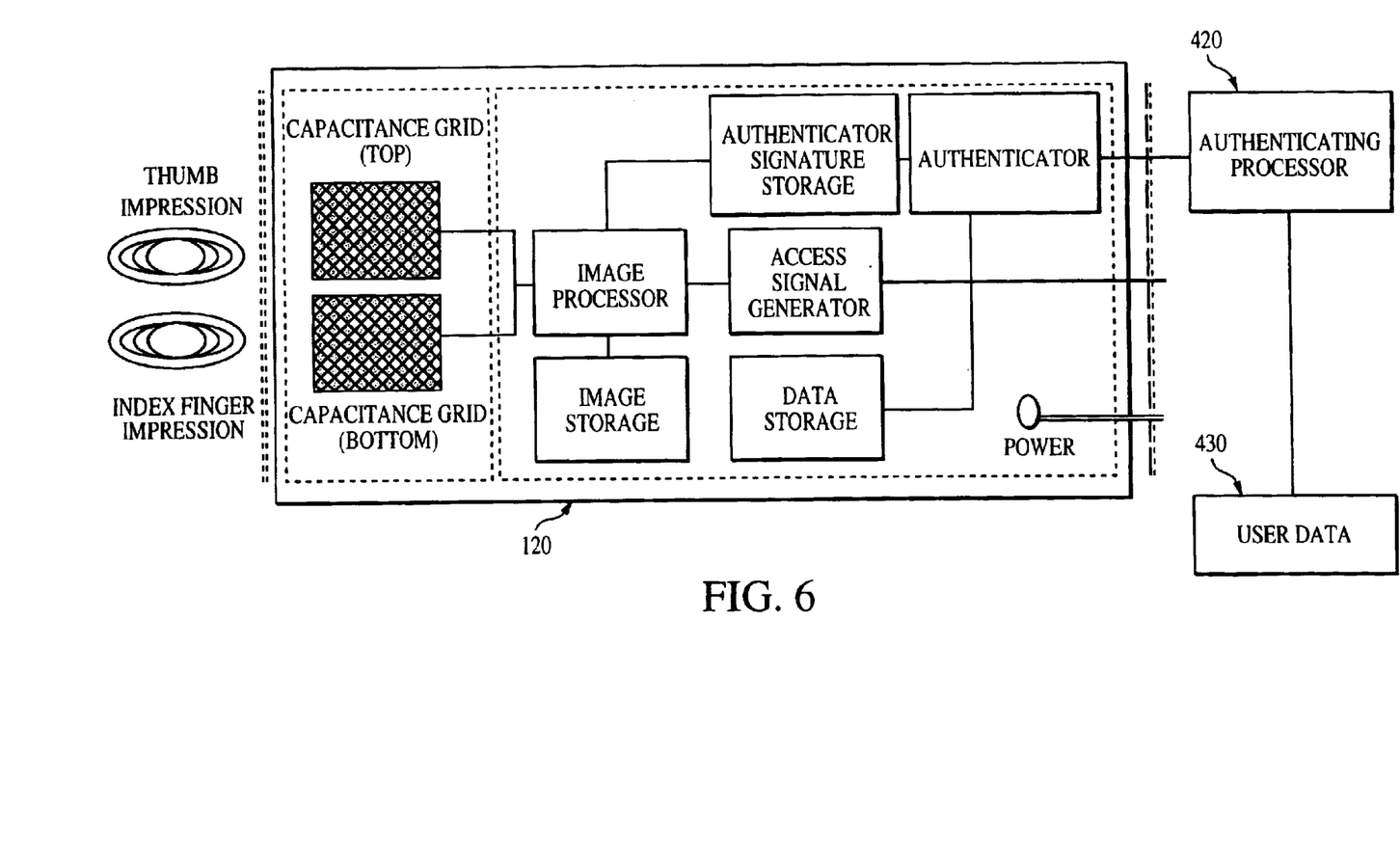
FIG. 6 shows the card and the authenticator interface.

FIG. 6 shows card 120 during the authentication processing phase. Card 120 is connected to authenticator 430. Authentication data is used to generate authentication signals. This scheme allows several authenticating agents. There is no need to carry the actual image of the fingerprint.

Figure 7:
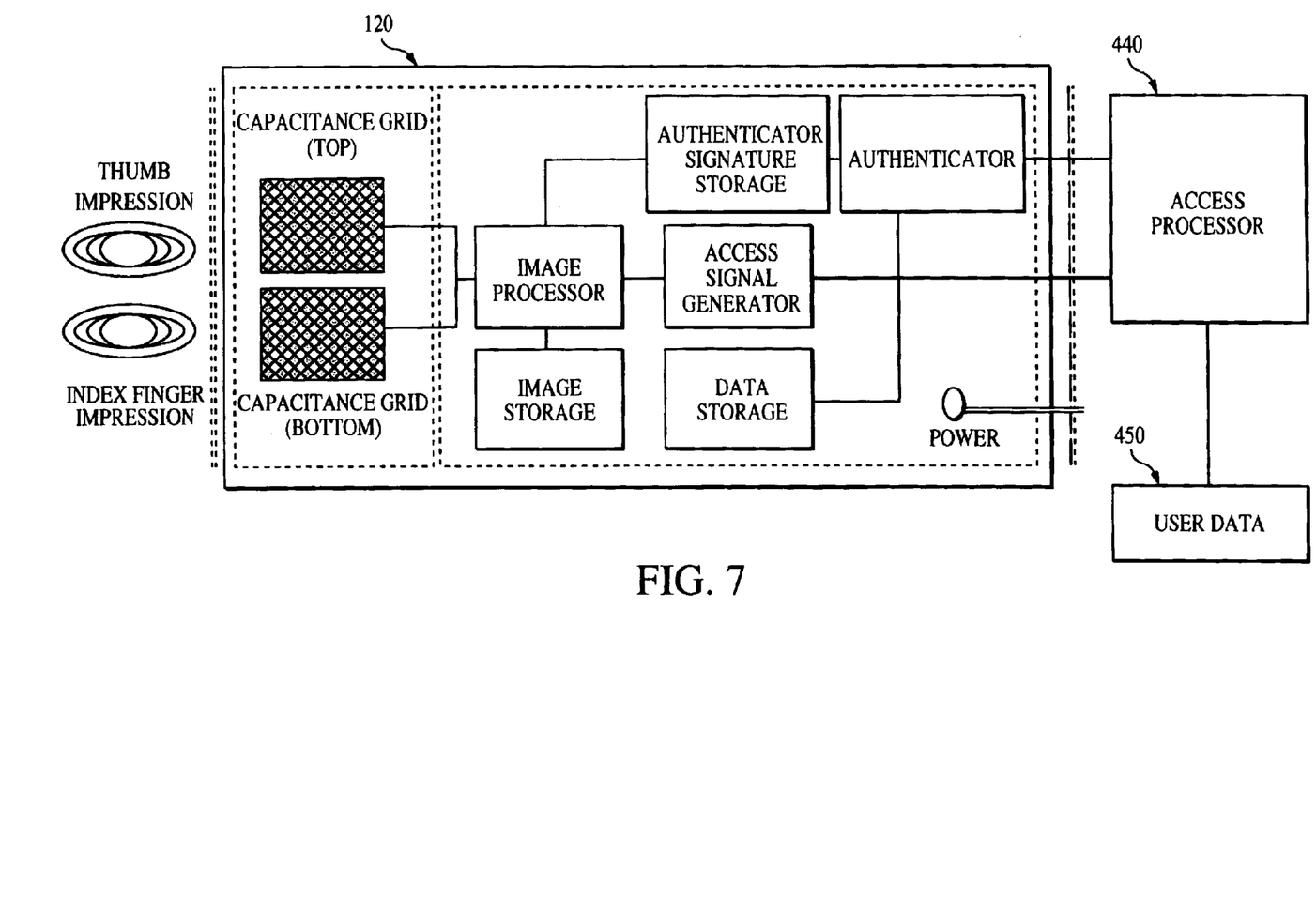
FIG. 7 shows the card with the access verifier interface.
Figure 8:
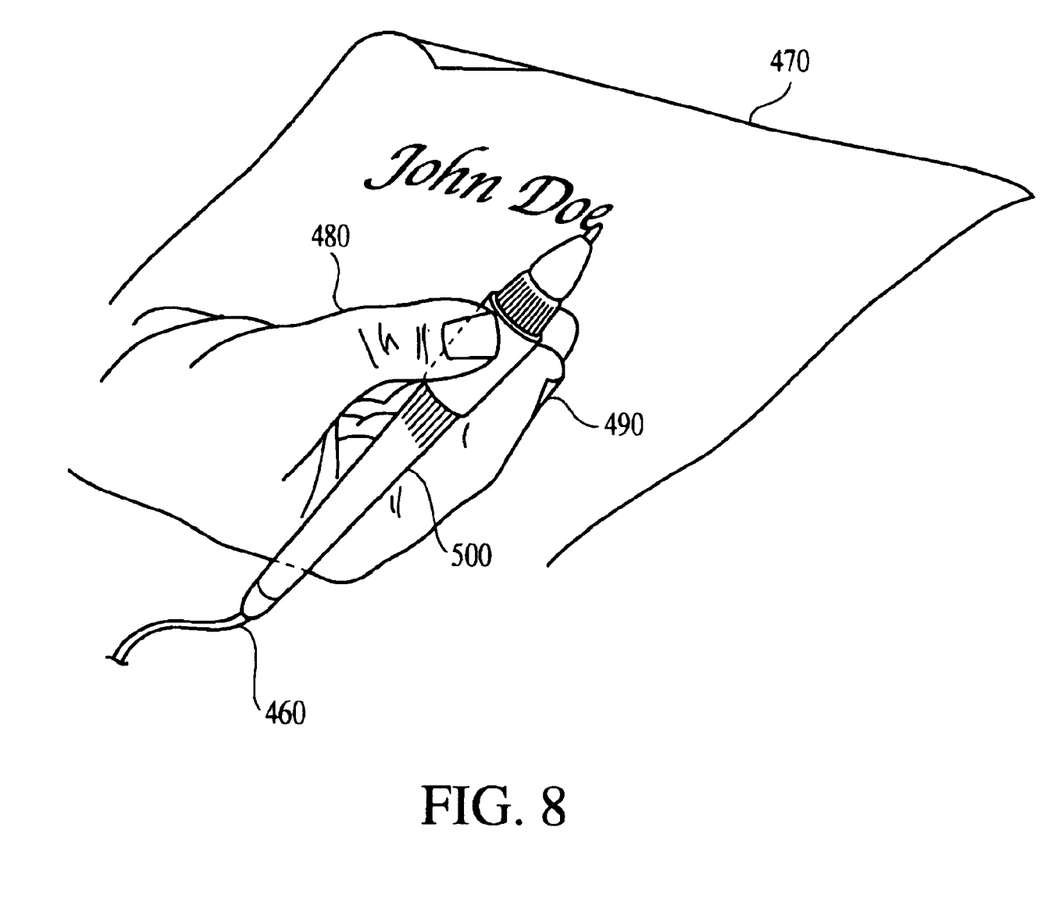
FIG. 8 shows an Identifier pen between the user's fingers.

FIG. 7 shows card 120 during the access validation phase. The card is connected to access processor 440, which uses access data 450 to verify and validate the user, FIG. 8 shows the card device modified into a pen device 460, which is used in combination with a signature pad 470. The pen device has two capacitance grids on the surface 500 of the pen, at locations where the user's thumb 480 and the index finger 490 will be holding the pen. In this arrangement, we accomplished several things. As the user holds the pen in a natural writing position, the two capacitance grids make contact with the thumb and the index finger and take the fingerprint impressions. Additionally, as the user signs, a signature impression is also taken. The signature impression can be based on accelerometers. Now, the card contains the user's signature, in addition to two of his/her fingerprint identification signals. This allows for greater security and actual notation that the user actually signed some part of a document.

Figure 9:
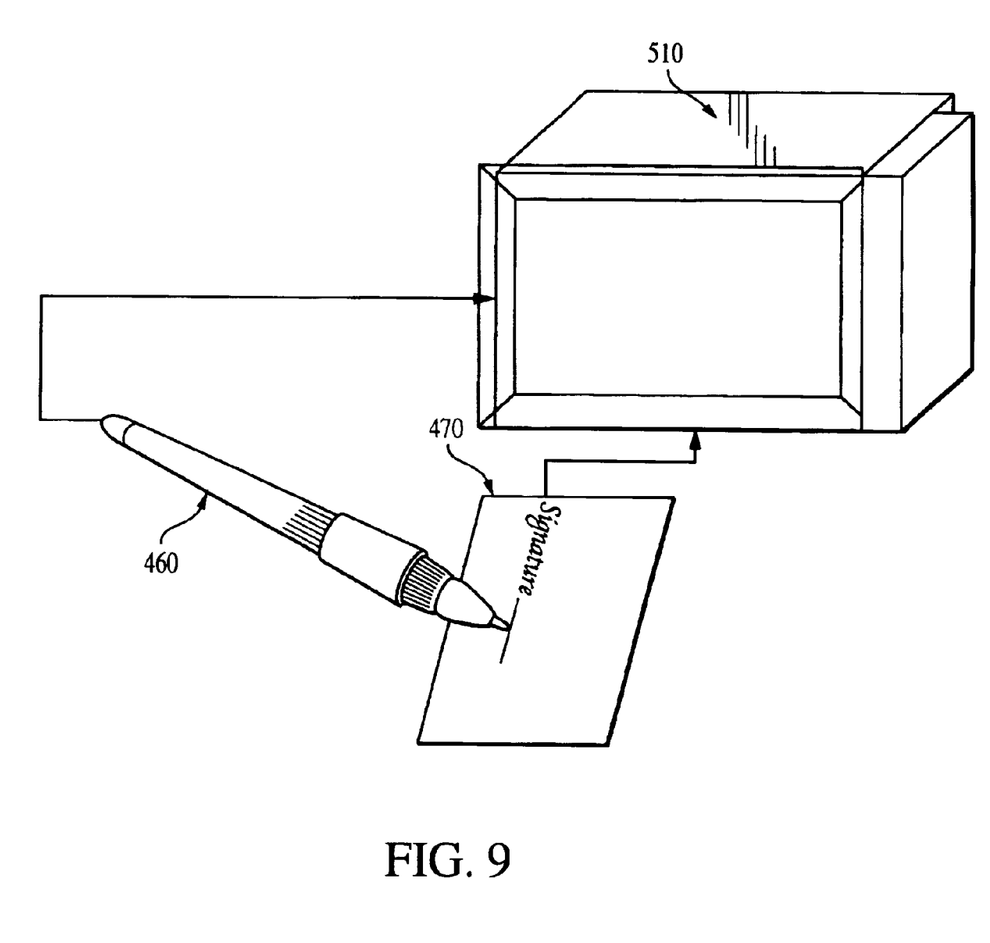
FIG. 9 shows the pen in use with a machine with hard wiring.

FIG. 9 shows a machine 510 with the pen 460 and signature pad 470 both of which are connected to the machine by hard wires. In this arrangement, the power for the pen can be supplied by the wired tether, which also carries the signals back and forth.

Figure 10:
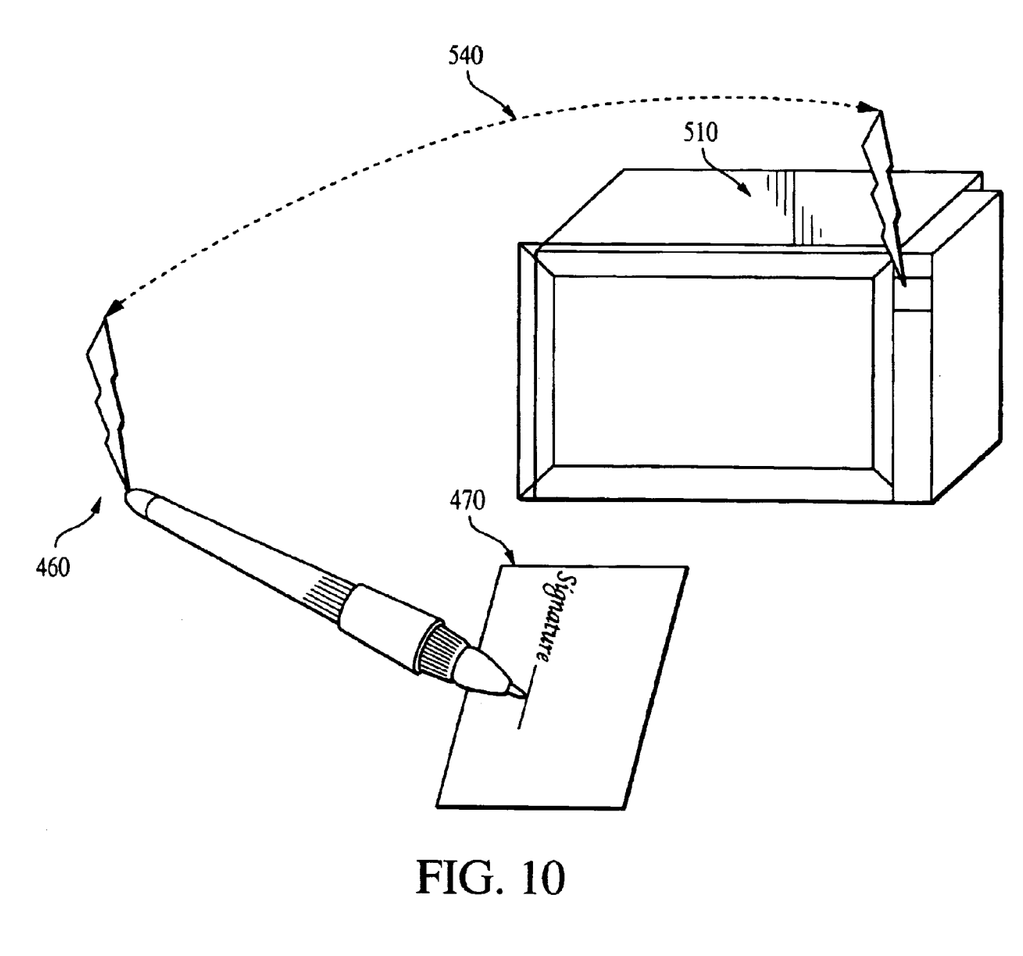
FIG. 10 shows the pen in use with a wireless connection.

FIG. 10 shows machine 510 with pen 460 but there is no wired tether. A wireless signal 540 is transmitted from the pen to the machine. This system has many advantages over the system and arrangement in FIG. 9. A user can use his/her pen and sign on a dummy writing pad and the signature signal will be transmitted when he/she presses on the fingerprint sensor grids with the thumb and index finger.

I have disclosed a smart card that is capable of reading a fingerprint. Actually, the card reads two fingerprints, one on each side. Electronic imprint (images) of the fingerprints are stored on the card itself. An authenticating agency mark is also imprinted electronically on the card. Subsequently, live fingerprint images are read and compared with stored images. A signal is generated depending on a match or mismatch. When a match occurs, a signal with permission is sent to the connected device.

The Smart Card disclosed herein has the following component modules:

Two capacitance grids that convert fingerprint images of the thumb and pointing finger into an electrical signal (simultaneously);

Authenticator software of a Certifying authority for authenticating the user name, User ID, and finger prints;

Authenticator Signature Storage to authenticate the agency's electronic signature;

Image Processor to process the fingerprint image(s) with the authenticator's signature algorithm;

Access Signal Generator to gain access to the connected machine;

Image Storage for the encrypted electronic image of the fingerprints;

Data Storage for encrypted user data; and

Power supply to operate card circuits.

The operation of the card is in two phases. The "Authentication Phase" has the following steps:

1. A blank card is connected to the authenticator by inserting it into an appropriate connector interface.
2. User data is entered into the authenticator's machine.
3. User holds the card so that impressions of the thumb and index finger are picked up by the capacitance grids.
4. The authenticator algorithm is loaded.
5. The authenticator's signature is stored.
6. Using the authenticator algorithm, the fingerprints are processed into resulting encrypted images.
7. User data is stored in the user data storage.
8. The encrypted fingerprint images are stored in the image storage.

At the end of the "Authentication Phase", the user has a card with his/her personal details and fingerprint images duly authenticated and encrypted.

The "Access Phase" has the following steps:

1. A user inserts his/her pre-authenticated card into the access processor machine interface.
2. User data is entered into the authenticator's machine.
3. The Authenticator and access processor check that they are compatible; if not, further processing is discontinued and access is denied by the access processor. Nothing is changed in the card.
4. If step 3 is successful, the user data is compared. If there is no match, no further processing is done. If there is a match, the user's impressions of the thumb and pointing finger are picked up by the capacitance grids.
5. The Authenticator's signature is loaded into the algorithm.
6. Using the authenticator algorithm, and signature, the fingerprints are processed into images.
7. The encrypted fingerprint images are retrieved from the image storage and compared to the processed current images.
8. If the images match, an access signal is generated.
9. The access signal is sent to the access processor machine, if there is a match, access is granted or else access is denied; no data in the card is changed.

At the end of the "Access Phase", the user has used his/her card to conduct a valid transaction. An unauthorized card or user is denied access by the access processor.

Although the foregoing description centered on a smart card device, the same principle can be applied to a mouse. Two capacitance grids can be placed on the sides of a mouse device, which reads the respective fingerprints. This arrangement is different from the Biomouse claimed by American Biometric Company. The Biomouse is not a mouse device, but merely a fingerprint reader. The smart mouse disclosed here is both a mouse as in a computer input device and a finger print identifier.

A smart mouse device can be used to authenticate and approve the use of a computer by approved users only. Occasionally, the smart mouse can be used to verify that the same approved user is operating the computer.

Instead of using a card, a user may wish to use a pen with the same functionality. In the case of a pen, the capacitance grids are placed on the sides of the pen where it is gripped. The capacitance grids are located so that a user places the thumb and the index finger on the sensing surfaces. This geometric arrangement serves the same purpose as the card with sensing surfaces on both sides. However, the pen device can be used to store a user's signature signal also. The user makes a signature mark on a pad. The motion of the pen during signature is captured as a signal and stored in the electronic circuitry in the pen itself. When the user wishes to enter a system, he/she uses the pen device. The fingerprint devices identify the user to the system and provides access to the system. The signature portion of the device allows the system to certify that the user actually signed a specific electronic document.

The user will find a pen device very convenient to carry and use it in a variety of places and circumstances. Highly sensitive financial transactions can be completed by using a pen as described here.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:
1. A method for identifying a user to a system comprising the steps of:
   a. inserting a blank object into an authenticator device;
   b. entering user data via said authenticator device;
   c. having the user hold the object so that impressions of the thumb and index finger are picked up by capacitance grids on said object;
   d. loading an authenticator algorithm on said object;
   e. storing an authenticated signature on said object;
   f. using the authenticator algorithm, processing said fingerprints into encrypted images;
   g. storing user data in a user data storage area on said object;
   h. storing the encrypted fingerprint images in an image storage area on said object;
   i. having said user insert said object into an access processor machine interface whereby said user data is entered into the system;
   j. checking that the authenticator and access processor are compatible; if they are not, further processing is discontinued and access is denied by the access processor
   k. if step j is successful, then said user data is compared. If there is no match, no further processing is done. If there is a match, the user's impressions of the thumb and pointing finger are picked up by capacitance grids on said object;
   l. loading the authenticator's signature into the algorithms;
   m. using the authenticator algorithm, and signature, processing the user's fingerprints into images;
   n. retrieving the encrypted fingerprint images from an image storage and comparing these images to the user's images;
   o. if these images match, generating an access signal to allow access to the system.

2. The method of claim 1 wherein the object comprises a credit card.

3. The method of claim 1 wherein the object comprises a pen.

4. An authorization device to allow a user access to a machine comprising:
   a pair of capacitance grids on an object to convert concurrent fingerprint images of the thumb and pointing finger into electrical signals;
   means for authenticating the object with a user's name, fingerprints, and other desired information;
   signature storage means in the object to store and authenticate the user's electronic signature;
   image processing means in the object to process the user's fingerprint images;
   an access signal generator to gain access to the machine;
   image storage means for storing the encrypted electronic image of the user's fingerprints;
   data storage means for storing encrypted user data; and
   power supply means to operate the device circuits, wherein said object comprises a credit-card.

5. An authorization device to allow a user access to a machine comprising:
   an object having first and second surface regions, wherein the first and second surface regions are located on opposite portions of the object;
   a pair of capacitance grids positioned on the first and second surface regions of the object to convert fingerprint images of the thumb and index finger into electrical signals;

image processing means in the object connected to the capacitance grids for processing the electrical signals to produce electrical images of the user's fingerprints;

image storage means in the object connected to the image processing means for storing an encrypted electrical image of an authorized user's fingerprints that have been previously recorded;

data storage means in the object for storing encrypted authorized user name and identification data;

means for authenticating the object connected to the data storage means, the image processing means, and the image storage means for comparing the user's fingerprint images detected on the capacitance grids with authorized user's previously recorded fingerprint images and for using the user's name and identification data to produce an authenticating signal; and an access signal generator connected to the authenticating means for gaining access to the machine in response to a signal from the authenticating means.

6. The device of claim 5, wherein the object comprises a credit-card.

7. The device of claim 5, wherein the object comprises a pen.

8. The device of claim 5, wherein the object comprises a computer mouse.

9. The device of claim 5, further comprising a power supply means to power for operating the object.

10. The device of claim 5, further comprising a signature storage means on the object connected to the authenticating means for storing a previously recorded image of the authorized user's signature, wherein the authenticating means compares user's signature with the user's previously recorded signature image to produce an authorization signal if they match.

11. An authorization device to allow a user access to a machine comprising:

an object having first and second surface regions, wherein the first and second surface regions are spaced apart on different portions of the object;

a pair of capacitance grids positioned on the first and second surface regions of the object to convert at least two concurrent fingerprint images of two fingers into electrical signals;

image processing means in the object connected to the capacitance grids for processing the electrical signals to produce electrical images of the user's fingerprints;

image storage means in the object connected to the image processing means for storing an encrypted electrical image of an authorized user's fingerprints that have been previously recorded;

data storage means in the object for storing encrypted user name and identification data;

means for authenticating the object connected to the data storage means, the image processing means, and the image storage means for comparing the user's fingerprint images detected on the capacitance grids with authorized user's previously recorded fingerprint images and for using the user's name and identification data to produce an authenticating signal; and an access signal generator connected to the authenticating means for gaining access to the machine.

12. The device of claim 11, wherein the object comprises a credit-card.

13. The device of claim 11, wherein the object comprises a pen.

14. The device of claim 11, wherein the object comprises a computer mouse.

15. The device of claim 11, further comprising a power supply means to provide power for operating the device.

16. The device of claim 11, further comprising a signature storage means on the object connected to the authenticating means for storing a previously recorded image of the authorized user's signature, wherein the authenticating means compares user's signature with the user's previously recorded signature image to produce-an authorization signal if they match.

17. A method for identifying an authorized user to a system with an object for accessing the system, comprising the steps of:

storing authorized user fingerprint images and identification data in a storage area of the object;

concurrently grasping the object with at least two fingers;

detecting the fingerprint images of at least two fingers of the user;

comparing the detected fingerprint images with the stored authorized user's fingerprint images;

providing access to the system if the detected fingerprint images substantially match the stored authorized fingerprint images.

18. The method of claim 17, wherein the fingers comprise the thumb and index fingers.

19. The method of claim 18, wherein the fingers grasp the object on opposing surface regions of the object.

20. A method for identifying an authorized user to a system with an object for accessing the system, comprising the steps of:

storing authorized user fingerprint images, signature images, and identification data in a storage area of the object;

grasping the object with at least two fingers concurrently and detecting the fingerprint images of at least two fingers of the user;

signing a means connected to the system for recording signatures and detecting the signature of the user;

comparing the detected fingerprint images with the stored authorized user's fingerprint images and the detected signature with the stored authorized user's signature;

providing access to the system if the detected fingerprint images substantially match the stored authorized fingerprint images and the detected signature substantially matches the stored authorized user's signature.

21. The method of claim 20, wherein the fingers comprise the thumb and index fingers.

22. The method of claim 20, wherein the fingers grasp the object on opposing surrace regions of the object.

23. The method of claim 22, wherein the object is selected from the group of a credit card or a pen.

24. The method of claim 20, wherein the object is a computer mouse.

* * * * *